United States Patent [19]

Martens et al.

[11] 4,181,752
[45] Jan. 1, 1980

[54] ACRYLIC-TYPE PRESSURE SENSITIVE ADHESIVES BY MEANS OF ULTRAVIOLET RADIATION CURING

[75] Inventors: John A. Martens, White Bear Lake; Lawrence M. Clemens, Minneapolis; Alvin R. Zigman, Woodbury, all of Minn.

[73] Assignee: Minnesota Mining and Manufacturing Company, St. Paul, Minn.

[21] Appl. No.: 945,406

[22] Filed: Sep. 25, 1978

Related U.S. Application Data

[63] Continuation-in-part of Ser. No. 680,056, Apr. 26, 1976, abandoned, which is a continuation of Ser. No. 502,426, Sep. 3, 1974, abandoned.

[51] Int. Cl.$^2$ ............................ C08F 2/46; C08F 4/00
[52] U.S. Cl. .......................... 427/54.1; 204/159.14; 204/159.16; 204/159.22; 204/159.23; 427/207 B; 428/355; 428/483; 428/508; 526/264; 526/303; 526/317

[58] Field of Search ............ 204/159.14, 159.16, 204/159.22, 159.23, 159.24; 427/54

[56] References Cited

U.S. PATENT DOCUMENTS

| | | | |
|---|---|---|---|
| 2,884,126 | 4/1959 | Ulrich | 206/59 |
| 3,328,194 | 6/1967 | Kasper | 117/62 |
| 3,661,618 | 5/1972 | Brookman et al. | 117/62 |
| 3,725,115 | 4/1973 | Christensen et al. | 117/93.31 |
| 3,729,338 | 4/1973 | Lehmann et al. | 117/122 P |
| 3,840,448 | 10/1974 | Osborn et al. | 204/159.14 |

FOREIGN PATENT DOCUMENTS 675420  5/1966  Belgium .

*Primary Examiner*—Richard B. Turer
*Attorney, Agent, or Firm*—Cruzan Alexander; Donald M. Sell; Donald C. Gipple

[57] ABSTRACT

Process for the preparation of a normally-tacky pressure-sensitive adhesive which comprises subjecting a solventless radiation-sensitive acrylate-containing polymerizable mass to radiation in the near UV region, at a rate of from about 0.1 to 7 milliwatts per square centimeter of the mass exposed.

12 Claims, No Drawings

ACRYLIC-TYPE PRESSURE SENSITIVE ADHESIVES BY MEANS OF ULTRAVIOLET RADIATION CURING

This application is a continuation-in-part of pending application Ser. No. 680,056 filed Apr. 26, 1976 now abandoned. Application Ser. No. 680,056 is a continuation of application Ser. No. 502,426 filed Sept. 3, 1974 (now abandoned), with which application Ser. No. 680,056 was copending.

BACKGROUND OF THE INVENTION

This invention relates to a process for the preparation of normally tacky acrylate copolymer pressure-sensitive adhesives and pressure-sensitive tapes comprising said adhesives.

The field of pressure-sensitive adhesives (and tapes made from them) is a broad one and the properties of the adhesives vary considerably within the field, depending, for example upon the projected end use. Two basic properties are of concern in all pressure-sensitive adhesives, however. These are compliance (the ability of the adhesive to conform to the substrate being adhered to) and cohesive strength (the ability of the adhesive to resist deformation under load). The latter relates critically to the holding power of the adhesive, or its ability to continue to perform under stress. While a balance of compliance and cohesive strength must be maintained in any pressure-sensitive adhesive, they are generally opposed. Thus, if an adhesive is too firm, its ability to 'wet' or comply with the surface being bonded will be lacking and, if the adhesive is too compliant, it will lack the strength necessary to maintain the bond under an applied load.

The acrylate copolymer pressure-sensitive adhesives, with which the present invention is concerned, are well known in the art (see for example in U.S. Pat. No. 2,884,126, Ulrich). They are generally copolymers of a major proportion of alkyl esters of acrylic acid (the alkyl group containing from about four to fourteen carbon atoms) and a minor proportion of at least one modifying monomer such as acrylic acid, methacrylic acid, acrylamide, acrylonitrile, methacrylonitrile, N-substituted acrylamides, hydroxy acrylates, N-vinyl pyrrolidinone, maleic anhydride or itaconic acid. They are among the most widely utilized adhesives in the manufacture of pressure-sensitive tapes for a variety of reasons (they are prepared from readily available and relatively low cost precursors which react easily to form copolymers having excellent properties, both initially and after aging). The adhesives are prepared commercially by either solution or emulsion polymerization techniques and pressure-sensitive tapes can be prepared from them by coating the polymeric solutions or emulsions. Both of these processes have inherent difficulties, however, particularly in view of present day needs for nonpolluting, energy-efficient, safe and low cost manufacture.

In the preparation of tapes utilizing the acrylate copolymer-solutions, elaborate drying ovens with massive exhaust ducts and high temperatures have been required to carry away the volatile solvents after coating. Furthermore, to prevent the solvents from being vented to the atmosphere (with resulting pollution and solvent loss) expensive solvent recovery equipment has been required. Safety hazards in such operations are also severe, as the solvents are extremely flammable and precautions must be taken to avoid explosive mixtures in the oven and exhaust systems. A further limitation of the solvent based systems is the limit on the thickness of the coatings which can be deposited in one trip or pass through the coater. Thus, with coatings above about 5 mils, multiple coating layers must be deposited in successive trips through the coater to avoid blistering of the coating due to solvent evaporation.

While emulsion polymerization has eliminated the problems associated with the handling and evaporation of flammable solvents, the heat of vaporization must be supplied to remove the water from the coating and essentially the same equipment must be employed. Though higher solids coatings are possible, the higher heat of vaporization of water as compared to organic solvents offsets this benefit and about the same total energy for drying is required. Drying times are relatively long, thus limiting production. One of the most serious limitations of the emulsion polymerization process is the water sensitivity of the resulting polymers (caused by the emulsifying agent which is carried along in the process and becomes part of the final polymer). A further limitation is that highly polar monomers, which are water miscible, are difficult to incorporate into the copolymer during polymerization and considerable homopolymerization of such monomers can occur in the aqueous phase.

Various attempts have been made to avoid the difficulties of the solution and emulsion polymer processes. However, these have thus far resulted either in processing difficulties of their own or have produced polymers in which the balance between compliance and cohesive strength is not controlled, or both of these difficulties are encountered. The following are representative of the art.

Christenson et al (U.S. Pat. No. 3,725,115) have proposed applying pressure-sensitive adhesive to a backing as a 100 percent solids hot melt of low molecular weight polymers which solidifies upon cooling and is then irradiated with an electron beam. Lehmann et al (U.S. Pat. No. 3,729,338) utilize heat to crosslink a mixture of a low molecular weight polymer and monomers previously coated in the presence of a small amount of solvent on a flexible backing. However, both of these methods require the preparation of relatively high viscosity spreadable compositions prior to coating, which makes handling difficult. The use of even small amounts of solvent is also very undesirable, for reasons already mentioned.

Brockman et al (U.S. Pat. No. 3,661,618) describe the preparation of pressure-sensitive tapes by coating a suitable backing at room temperature with a mixture preferably containing a multifunctional monomer and then polymerizing the coating by exposure to high energy particle radiation. The use of elaborate and expensive safety equipment together with the equipment necessary to the generation of the beam of high energy electrons would be required in any production unit utilizing this method.

Ultraviolet irradiation has also been used in the polymerization curing and/or crosslinking of coating compositions, including acrylates. Netherlands Pat. No. 7,308,811 (Osborn et al), thus relates to a method of using low intensity, shortwave ultraviolet radiation of a critical and very limited wave length (i.e. 2537 Å) to preferentially surface polymerize or cure or crosslink printing inks and other coatings containing acrylyl groups among others. U.S. Pat. No. 3,328,194 (Kasper), Canadian Pat. No. 609,525 (Charbonneau et al) and Belgium Patent 675,420 (Novacel SA) all disclose the use of ultraviolet irradiation in the manufacture of pressure-sensitive tapes. Kasper discloses the use of either low-intensity or high-intensity UV to irradiate an already formed pressure-sensitive tape to improve its creep resistance. Charbonneau et al discloses a method of effectively bonding to the normally bond-resistant surface of a solid linear polyester by forming an interface between the surface of the polyester and an organic hydrogen-containing polymer (applied to the polyester as a primer or in some cases as a pressure-sensitive adhesive) and then irradiating the interfacial area with relatively high-intensity ultraviolet light through the polymer. Acrylate-type polymers are not disclosed however.

The Belgium patent relates in part to a process for the preparation of pressure-sensitive adhesive tapes by the irradiation of tape backings coated with acrylic monomers or mixtures of such monomers with copolymerizable compounds (with or without thickening or initiating agents) with ultraviolet light, as does the present invention. However, that patent discloses nothing of the specific intensity and the specific spectral distribution of the irradiation which are critical features of the present process as will become apparent.

THE PRESENT INVENTION

The present invention relates to a process for the free radical polymerization of acrylic type monomers by means of ultraviolet irradiation under controlled conditions, especially of the nature and rate of the irradiation, to prepare pressure-sensitive adhesives.

More particularly, the process comprises subjecting a mass of up to about 1.9 centimeters thickness of a suitably radiation-sensitized solventless liquid mixture of at least one acrylate-type monomer and at least one monomer copolymerizable therewith to radiation in the near ultraviolet region at a rate of irradiation in the 3000–4000 Å range of from 0.1 to 7 milliwatts per square centimeter of the mass exposed, said radiation allowably also containing incidental radiation energy, the amount of said incidental radiation energy having wave lengths shorter than 3000 Å being limited to not more than about 10% of the amount of energy in the 3000–4000 Å range, until at least about 95% of the monomer has been polymerized, whereby a tacky, flexible pressure-sensitive adhesive having peel adhesion to glass greater than about 0.8 kilograms per centimeter and shear strength greater than 50 minutes is formed (these values being defined in terms of the test procedures set out hereinafter). The process is carried out without solvent pollution or operator hazard and at low energy consumption levels. Simplified production equipment can be used and the difficulties of large scale operation are minimal.

The acrylate-type monomers can be characterized as acrylic acid esters of alkyl alcohols, said alcohols containing from 4 to 14 carbon atoms. The monomers copolymerizable with the acrylic acid ester can include acrylic acid, methacrylic acid, acrylamide, acrylonitrile, methacrylonitrile, N-substituted acrylamides, hydroxy acrylates, N-vinyl pyrrolidinone, maleic anhydride and itaconic acid.

The monomers and the proportions thereof are selected to provide a normally tacky and pressure-sensitive adhesive copolymer. Normally this means that the monomer mixture will contain from 70 to 98 parts by weight of the acrylate-type monomer and 2 to 30 parts of the monomer copolymerizable therewith (the modifying monomer), the sum of these two being 100 parts by weight. More than one acrylate-type monomer and/or more than one modifying monomer can be utilized in a single mixture if desired. In addition to the monomers, the radiation-sensitive mixture also contains from about 0.01 to 5 parts of a photoinitiator. More preferably the monomer mixture contains 85 to 92 parts of the acrylate-type monomer and 15 to 8 parts of the modifying monomer.

The process of the invention can be carried out successfully in relatively thick sections (up to 1.9 centimeters or even greater) since the polymerizable mixture is relatively transparent to the irradiating energy (or at least transmits a major portion thereof). Although the thicker cross sections may be desirable for other applications, pressure-sensitive tapes are ordinarily prepared with coatings in the 25–125 micron (1–5 mil) thickness range.

Although the invention is in no way limited thereby, it is believed that the spectral distribution of the irradiation together with the rate of irradiation substantially control the rate of polymerization, and that the rate of polymerization in turn determines the molecular weight of the resulting polymer. The molecular weight of the polymer and the choice of the monomers are among the factors that finally determine the properties.

Rates of polymerization higher than those utilized in the present invention have been found to result in polymers which have unduly low molecular weights, which in turn results in cohesive strengths so low that the polymer has little value as a pressure-sensitive adhesive. A rate of irradiation below about 0.1 milliwatts per square centimeter, while not necessarily deleterious to the polymer properties, is unnecessarily and undesirably slow.

Preferably the radiation energy all falls within the 3000–4000 Å range. Although a small amount of irradiation below 3000 Å can be tolerated (up to about 10 percent of the energy in the 3000–4000 Å range), any more substantial amount of such irradiation causes a severe loss of cohesive strength as measured by shear. Furthermore, longer wavelength irradiation can also be deleterious. Thus, if considerable energy is present as infrared (i.e. above 8000 Å), the molecular weight may be affected (as well as the peel and shear values of the adhesive) unless particular arrangements are made to maintain the mixture below about 35° C. until polymerization has been completed. Increased temperatures not attributable to infrared irradiation are similarly harmful. Thus the polymerization is usually carried out at 20°–25° C. or even lower and undesirable effects can occur even as low as 35° C. during polymerization.

Once the mixture is polymerized, considerable additional irradiation of the same nature (both as to intensity and wave lengths) and considerable heat can be tolerated without adverse effect on the polymer. However, a very large overdose of irradiation (such as a 100 fold overdose, compared to the amount required for polymerization) can be deleterious to the pressure-sensitive adhesive properties, with a severe loss of compliance (as reflected in the peel test, discussed hereinafter).

Polymerization, according to the process of the invention takes place by means of the free radical mechanism. Thus, once polymerization has been initiated in an individual polymer chain, it will grow very rapidly until chain termination occurs. The molecular weight of that particular chain is then fixed and, if conditions are kept constant, other chains will tend to reach approximately the same molecular weight before undergoing chain termination. Thus, the average molecular weight of the polymer in the system remains relatively constant throughout the course of the polymerization (i.e. regardless of whether polymerization has just started or is essentially completed).

The irradiation is preferably carried out in the absence of air and oxygen (which inhibit the polymerization reaction). Thus, it is normally carried out in an inert atmosphere such as nitrogen, carbon dioxide, helium, argon, etc. Air can also be excluded by sandwiching the liquid polymerizable mixture between layers of solid sheet material and irradiating through the sheet material. As will be appreciated by those skilled in the art, such materials can have low adhesion surfaces and can be removed after polymerization is complete or one such surface can be a tape backing material.

The selection of a proper photoinitiator is important to the overall process since this species acts to absorb and utilize the light energy to initiate photopolymerization. Photoinitiators suitable for the process are those commonly used in the polymerization of vinyl compounds. Among the well-known photoinitiators of this type are the acyloin ethers (such as benzoin ethyl ether, benzoin isopropyl ether, anisoin ethyl ether and anisoin isopropyl ether), substituted acyloin ethers (such as alpha-hydroxymethyl benzoin ethyl ether), Michler's ketone (4,4'-tetramethyldiaminobenzophenone) etc.

For some pressure-sensitive adhesive applications, crosslinking is also required, particularly where it is desired to increase the cohesive strength of the adhesive without unduly affecting its compliance. This can be achieved by utilizing a photoactive crosslinking agent in conjunction with the photoinitiator. These include benzaldehyde, acetaldehyde, anthraquinone, substituted anthraquinones, various benzophenone-type compounds and certain chromophore-substituted vinylhalomethyl-s-triazines, such as 2,4-bis(trichloromethyl)-6-p-methoxystyryl-s-triazine.

The monomer mixtures per se are generally of low viscosity, too low in fact to be handled conveniently. In order to increase the viscosities to a more desirable level, the monomer mixtures can be prepolymerized prior to the coating, until a small degree of polymerization (e.g. 5–10%) has taken place, thus forming a syrup. The irradiation during the prepolymerization is preferably of the same nature as that used for the remainder of the polymerization, so that the polymer formed during both steps is the same. Other methods of increasing the viscosity of the monomer mixture are also available, however, such as thermal polymerization or the addition of viscosity modifying agents such as high molecular weight polymers or thixotropic agents such as colloidal silicas, etc.

The present process may be used to manufacture many different types of pressure-sensitive tape. Thus, various flexible backings and liners may be used, including films (transparent and non-transparent), cloths, papers, non-woven fibrous constructions, metal foils, aligned filaments, etc. Also fillers, tackifiers, chain transfer agents, colored pigments, opacifiers, solvents and other constituents known to the tape art may be incorporated in the adhesives.

A series of non-limiting examples are set out hereinafter to illustrate the invention in its various aspects. First, however, certain procedures and tests utilized therein will be described, with exceptions thereto being specifically noted in the examples themselves.

The parts, in the examples are given by weight and percentages of constituents are based on percentage of the total weights of monomers present. The materials were coated as syrups of about 1500 cps (Brookfield) viscosity. At this viscosity, the materials were about 10 percent polymerized. Coating of the syrups was accomplished by passing a web of 2 mil polyethylene terephthalate film under a #42 wire-wound bar behind which a supply of syrup was maintained, with the result that a thin, uniform layer of the syrup was produced on the film (about 55 microns or 2.2 mils). The web was maintained in an inert (nitrogen) atmosphere after coating it with syrup until after irradiation and polymerization of the adhesive. This was accomplished by passing the web through a chamber of 2.5–5 cm (1–2 inch) thickness constructed of material transparent to the desired radiation, said chamber being continually flushed with nitrogen during coating and irradiation.

Four different arrangements (including sources, mounting equipment and, in some cases, filters to remove certain wave lengths) were used to irradiate the polymerizable mixtures. These are described in terms of the radiation delivered to the web as follows:

A. Delivers ultraviolet radiation of intensity and spectral distribution utilized in the present invention.

The source was a bank of twenty-four F15 T8 B1 cylindrical fluorescent black light lamps of the type commonly used to activate fluorescent paints which are available from the General Electric Company. The operating power of these lamps is about 1 watt per inch of lamp length. They emit light principally in the near UV wavelength region over the range from 3200 Å to 3800 Å, and emit no light at less than about 3000 Å and a minimum amount above 8000 Å. No filters are used. The lamps in this bank were mounted in a frame above the moving web with the lamps parallel to each other on 3.5 centimeter centers and the lamp axes perpendicular to the web. The lamp to web distance was about 7.6 centimeters (3 inches). The intensity of radiation could be varied by changing the operating voltage of the lamps with a variable transformer. The normal operating voltage in each case (unless otherwise noted) was 120 volts AC, however.

B. Delivers ultraviolet radiation of intensity considerably greater than that utilized in source A and includes infrared as well as ultraviolet radiation above 3000 Å.

The source was an 800 watt medium pressure mercury arc lamp cylindrical in shape and 8 inches long (100 watts/inch) of the type available from Hanovia Mfg. Co. This lamp has approximately the following output breakdown

| UV Range | Watts/inch |
| --- | --- |
| 2,200–2,800 Å | 12.6 |
| 2,800–3,200 Å | 10.5 |
| 3,200–4,000 Å | 9.5 |
| Total UV | 32.6 |
| Visible 4,000–8,000 Å | 15.1 |
| Infrared: 8,000 Å and above | 52.3 |

The lamp was mounted above the web at a distance of 15.2 centimeters (6 inches) unless otherwise indicated. The lamp was fitted with a reflector assembly which directed energy toward the web and produced an essentially uniform light intensity profile on the moving web.

The radiation from the lamp was transmitted through a ⅛" thick plate of pyrex glass before striking the coating to be polymerized which served to limit short wavelength UV energy (shorter than about 3000 Å).

C. Delivers ultraviolet radiation of intensity utilized in the present invention but in the short wavelength area. The source consisted of a bank of twenty-four common germicidal mercury lamps similar to the black light source of A above with the exception that there are no phosphors on the windows of the lamps and the windows are made of quartz, which allows the transmission of the short wavelengths. The lamp output is almost totally in the 2537 Å wavelength region. The same experimental setup was utilized as in light source A except that 15 watt germicidal lamps were substituted for the black lamps and were mounted above the moving web on 3.5 cm (1⅜ inch) centers at a distance of about 7.6 cm (3 inches) from the web.

D. Delivers ultraviolet radiation of intensity and wavelength distribution considerably outside that utilized in the present invention. It utilizes the same lamp and arrangement as in B, except replacing the ⅛" thick plate of pyrex glass with a ⅛" thick plate of quartz (which transmits essentially the entire output of the lamp, as specified under B). Thus, D. includes a broad spectrum of wavelengths and spectral distribution from infrared (8000 Å and above) through short wavelength UV (2,200–2,800 Å).

The spectral distribution and intensity of the energy incident on the web was determined for each of the ultraviolet sources utilized in the examples by means of a double difraction grating spectroradiometer (a product of the Cintra Corporation). This instrument employs a photo-multiplier for the detection of the radiation and has been calibrated according to the National Bureau of Standards using a standard quartz-iodide light source. It is capable of measuring the intensities of radiation at specific wavelength ranges.

The spectral distributions of the light sources are shown in Table I.

TABLE 1.

| SPECTRAL DISTRIBUTION OF LIGHT SOURCES INTENSITY (MILLIWATTS/CM.$^2$) | | | |
|---|---|---|---|
| LIGHT SOURCE | 2500–3000 Å | 3000–4000 Å | 4000–7600 Å |
| A | $6.1 \times 10^{-5}$ | .337 | .146 |
| B | .276 | 6.76 | 13.34 |
| C | .724 | .044 | .085 |
| D | 8.5 | 12.91 | 14.32 |

The coated web was moved at continuous and uniform speed under the light sources to accomplish the polymerization. The exposure time was varied by changing the rate of movement of the web beneath the lamps. The total dosage at 3000–4000 Å was determined by multiplying the measured intensity in that wavelength range under the irradiation conditions by the exposure time in seconds.

In all cases the extent of polymerization was monitored by measuring the refractive index of the adhesive layer. Refractive index is a sensitive measure of the extent of polymerization and for these systems changes from about 1.4300 at the syrup stage to about 1.4700 at 100% reaction. The change in refractive index occurs linearly with conversion of acrylate unsaturation. This method is commonly applied in polymerization kinetics work. See for example discussions about the method in Polymerization at Advanced Degrees of Conversion, G. P. Gladyshev and K. M. Gibov, Keter Press, Jerusalem, 1970.

Only enough exposure time was allowed to bring all samples to about the same degree of reaction as determined by refractive index, which was about 95%. The rate of polymerization described in the examples was calculated as an average rate of reaction based on the polymerization time and the molar concentration of unsaturation in the starting material assuming reaction to be essentially complete within the allotted time. In cases where percent polymerization per minute is greater than 100% it is indicated that the polymerization was completed in less than 1 minute.

The relative molecular weights of the polymers have been compared by means of inherent viscosity. The inherent viscosity measurements reported herein were made in tetrahydrofuran solution at a polymer concentration of no greater than about 0.1 gram of polymer per 100 grams of solution at approximately 25° C.

Test procedures used in the examples to evaluate and compare the properties of pressure sensitive adhesives (and which are conventionally used in the industry for the same purposes) are as follows:

The compliances of the adhesives have been compared quantitatively by the following peel adhesion test: A strip of 1.25 centimeters (½ inch) wide sheet material, preferably 25 micron (1 mil) polyester film, is provided with a 75 micron (3 mil) coating of adhesive and placed adhesive face down on a clean horizontal glass plate. The strip (which is conveniently about 45 centimeters long) is pressed into adhesive contact with the glass by passing a hard rubber roller weighing 2.1 kilograms (4.5 pounds) over the strip at a rate of about 3.8 centimeters per second. One end of the strip is attached to a suitable scale and the glass plate is moved away from the scale at a rate of about 3.8 centimeters per second. The portion of the tape removed comes back adjacent but not quite touching the portion still adherently attached (hence the test can be referred to as a 180° peel adhesion test). The scale reading in kilograms or pounds is a measure of the adhesion to the glass. The data are reported as the range of numbers observed during the test and a replicate is tested in all cases.

The cohesive strengths of the adhesives have been compared by means of the following shear strength test: The test is run using a tape having a 75 micron (3 mil) layer of the adhesive on paper, polyester film or any other suitable flexible backing material. A 1.25 centimeter (½ inch) wide strip of the tape is placed adhesive side toward an essentially vertical stainless steel plate (the face of the steel plate to which the tape is adhered being angled upward approximately two degrees to prevent peeling of the tape away from the panel) so that they overlap each other by 1.25 centimeter (½ inch), resulting in a mutual adhesive contact area of 1.25 centimeters by 1.25 centimeters (½ inch by ½ inch). The tape and the stainless steel plate are pressed into contact by passing a hard rubber roller weighing 2.1 kilograms (4.5 pounds) over this contacting area at about 3.8 centimeters per second and the bond is then tensioned by the application of a force of 1,000 grams applied as a weight hanging from the tape. The time required for the tape to separate from the steel plate is measured and recorded as the shear strength of the adhesive. In addition, the mode of failure is recorded, the following abbreviations being used: COH = cohesive failure meaning that the adhesive split leaving essentially equal residues on both the tape backing and the plate after failure; P=pop-off failure indicating that the adhesive failed cleanly from the plate leaving no residue; C/P=cohesive/pop-off indicating that the adhesive failed partially in each manner leaving partial residues on both plate and backing but at the same time leaving partial areas clean of residues. Failure involving pop-off in any form indicates that the adhesive is somewhat deficient in compliance and in adhesion to the plate.

The packaging test. This test, which is familiar to those skilled in the art, is used to evaluate pressure-sensitive adhesives for use in packaging and similar applications. Two types of boxes were employed in the tests for each tape sample. The first was a lighter weight box intended for light packaging duty. The accepted description of the box is the following: Regular slotted construction (RSC), dimensions 6⅞"×6⅞"×3½", constructed of 200 pound test c flute fiberboard. The second box was of a much firmer construction, and hence designed for heavier packaging duty. The accepted designation for the construction is as follows: Regular slotted construction (RSC), dimensions 6¾"×6¾"×3⅛", constructed from V3c fiberboard. The boxes differed considerably in the forces they applied to the adhesive area. A sample of the test tape, ½ inch ×3 inches was applied across the folded box flaps and rubbed lightly with fingertip pressure to insure adhesion. Another sample of the same tape was applied to the other box seam for replication. The box flaps were released stressing the adhesive tape bond and failure occurred if the box opened or the tape slipped more than 0.5 mm. The time of initiation of the test was noted on the boxes and the failure time and mode also recorded.

EXAMPLES 1-17

The effects of intensity and spectral distribution of irradiation.

Examples 1-17 provide comparisons of samples produced according to the present invention with samples produced at a higher intensity and with irradiation containing short wave length UV light (less than 3000 Å), substantial amounts of infrared as well as ultraviolet within the 3000-4000 Å range.

Three coatable syrups were prepared for subsequent irradiation as follows:

(1) 90 parts of isooctyl acrylate and 10 parts of acrylic acid were copolymerized by conventional means to the point where the viscosity of the mass was about 1500 cps (Brookfield) as measured at room temperature. Approximately ten percent of the polymerization took place during this prepolymerization. The syrup was stabilized by bubbling air into the flask. The mixture was held for further formulation.

(2) 90 parts of 2-ethyl hexyl acrylate and 10 parts of acrylic acid were mixed in a glass jar and 0.25 parts by weight benzoin ethyl ether (BEE) were dissolved in the monomer mixture. Several chips of dry ice were added to the solution, the bottle was tightly capped, and the contents gently swirled. From time to time, the cap was loosened to release the internal pressure and thereby sweep out the oxygen in the system. At the point where the dry ice disappeared, the jar was capped tightly and the contents exposed to the irradiation from two 15 watt black light fluorescent lamps while the jar was gently swirled. During the irradiation, the bulk viscosity of the mixture increased visibly and the irradiation was stopped when the viscosity appeared to reach about 1500 cps (Brookfield). Air was bubbled in as in (1) and the contents were held for subsequent formulation and coating as described below.

(3) 90 parts of 2-methyl butyl acrylate and 10 parts of acrylic acid were combined with 0.25 parts by weight of BEE and the mixture partially polymerized as described for composition (2) above. The contents were similarly treated with air and held for further manipulation.

Portions of these three syrups were prepared, additional amounts of benzoin ethyl ether (BEE) were added as required, photopolymerizations were carried out thereon and the inherent viscosities of the resulting polymers measured, all as shown in the following table.

Table II

| | | | | Process Variables | | | | | |
| | | | | Light Intensity 3000-4000A | Total Energy 3000-4000A | Exposure | Rate of Polymerization | | |
| Example No. | Composition | % BEE | Light Source (volts) | mwatts/cm$^2$ | mwatt-sec/cm$^2$ | Time (min) | g-moles/liter-min | %/min | Inherent Viscosity |
|---|---|---|---|---|---|---|---|---|---|
| 1 | (1) | 0.10 | A (120) | .337 | 111.2 | 5.5 | 0.93 | 18 | 2.41 |
| 2 | (1) | 0.25 | A (120) | .337 | 66.7 | 3.3 | 1.56 | 30 | 1.90 |
| 3 | (1) | 0.50 | A (120) | .337 | 52.6 | 2.6 | 1.98 | 39 | 1.75 |
| 4 | (1) | 1.00 | A (120) | .337 | 31.3 | 1.55 | 3.31 | 64 | 1.48 |
| 5 | (1) | 2.00 | A (120) | .337 | 21.8 | 1.08 | 4.76 | 93 | 1.26 |
| 6 | (1) | 2.00 | B — | 6.76 | 162.0 | 0.40 | 12.84 | 250 | 1.02 |
| 7 | (1) | 0.25 | D — | 12.91 | 271.0 | 0.35 | 14.7 | 266 | 0.76 |
| 8 | (2) | 0.25 | A (120) | .337 | 65.7 | 3.25 | 1.58 | 31 | 1.81 |
| 9 | (2) | 0.25 | A (96) | .294 | 66.6 | 3.77 | 1.36 | 27 | 2.12 |
| 10 | (2) | 0.25 | A (84) | .213 | 56.2 | 4.40 | 1.17 | 23 | 2.41 |
| 11 | (2) | 2.00 | B — | 6.76 | 162.0 | 0.40 | 12.84 | 250 | 0.94 |
| 12 | (3) | 0.25 | A (120) | .337 | 58.6 | 2.9 | 2.29 | 35 | 2.35 |
| 13 | (3) | 0.25 | A (96) | .294 | 59.1 | 3.35 | 1.98 | 30 | 2.77 |
| 14 | (3) | 0.25 | A (84) | .213 | 56.2 | 4.40 | 1.51 | 23 | 2.71 |
| 15 | (3) | 2.00 | B — | 6.76 | 162.0 | 0.40 | 16.61 | 250 | 1.29 |
| 16 | (3) | 0.25 | D — | 12.91 | 154.9 | 0.2 | 25.74 | 500 | 0.72 |
| 17 | (3) | 0.25 | B* | 1.82 | 142.0 | 0.5 | 10.3 | 200 | 1.59 |

*The lamp to web distance was 15 inches instead of six inches in Example 17.

Thus, the molecular weight, as determined by inherent viscosity can be controlled by factors such as the rate of polymerization which in turn is regulated by the amount of absorbed energy. The rate can be controlled, as shown, by varying either the amount of photoinitiator or the light intensity, or both. The importance of these reaction conditions is reflected in the performance of the adhesive tapes which were produced. These data are summarized in the following Table:

Table III
Product Evaluation

| Example | Peel Adhesion (kg/cm) | R.T.(23° C.) Shear 1000 gr. 1.56 cm² (min. to fail) |
|---|---|---|
| 1 | 1.06–1.08 | 53.8 COH |
|   | 1.10–1.16 | 53.8 COH |
| 2 | .76–.82 | 87.9 COH |
|   | .84–.98 | 100.0 COH |
| 3 | 1.20–1.26 | 74.0 COH |
|   | 1.30–1.34 | 74.2 COH |
| 4 | .96–1.02 | 54.0 COH |
|   | .96–1.12 | 54.7 COH |
| 5 | .84–.96 | 36.0 COH |
|   | .96–1.02 | 15.1 COH |
| 6 | .54–.62 | 0.2 COH |
|   | .50–.54 | 0.2 COH |
| 7 | 1.42–1.46 COH* | 1.7 COH |
|   | 1.20–1.26 COH* | 1.6 COH |
| 8 | 1.08–1.12 | 36.7 COH |
|   | 1.14–1.18 | 36.8 COH |
| 9 | 1.12–1.18 | 60.8 COH |
|   | 1.26–1.30 | 64.7 COH |
| 10 | 1.08–1.16 | 113.2 COH |
|   | 1.16–1.26 | 103.2 COH |
| 11 | .72–.76 | 0.2 COH |
|   | .62–.76 | 0.1 COH |
| 12 | 1.18–1.22 | 250.0 COH |
|   | 1.20–1.26 | 263.0 COH |
| 13 | 1.20–1.28 | 254.0 COH |
|   | 1.32–1.42 | 202.0 COH |
| 14 | 1.22–1.30 | 391.0 COH |
|   | 1.34–1.52 | 389.0 COH |
| 15 | .92–.98 | 53.1 COH |
|   | 1.00–1.10 | 49.0 COH |
| 16 | 1.06–1.12 | 6.2 COH |
|   | 1.16–1.20 | 6.5 COH |
| 17 | 1.02–1.12 | 99.0 COH |
|   | 1.02–1.10 | 95.0 COH |

*The adhesive failed in Example 7 at least partially during the peel test, leaving a residue on the glass plate.

These examples show that, in general, at high rates of polymerization (brought about by means of relatively high rates of irradiation alone or together with spectral distributions outside those utilized in the present process), the cohesive strength of the resulting pressure-sensitive adhesive (as measured by shear performance) is reduced substantially and the peel adhesion may also be impaired.

EXAMPLES 18–22

The effects of irradiating with ultraviolet light of low intensity (comparable to that used in the present process) but in the short wavelength area.

Syrup (1), previously described, containing 0.25 parts by weight benzoin ethyl ether (BEE) was used. BEE is an efficient absorber of light into the shorter wave length UV region and has a much higher absorption coefficient at the shorter wave lengths. The exposure was varied by changing the rate of movement of the web beneath the lamps. The results are summarized in the following tables:

Table IV

| | | | | Process Variables | | | | | |
|---|---|---|---|---|---|---|---|---|---|
| Example No. | Composition | % BEE | Light Source (volts) | Light Intensity 3000–4000Å mwatts/cm² | Total Energy 3000–4000 Å mwatt-sec/cm² | Exposure Time (min) | Rate of Polymerization g-moles/liter-min | %/min | Inherent Viscosity |
| 18 | (1) | 0.25 | C (120) | 0.044 | 1.8 | 0.68 | 7.55 | 147 | 1.12 |
| 19 | (1) | 0.25 | C (84) | 0.028 | 1.34 | 0.80 | 6.43 | 125 | 1.29 |
| 20 | (1) | 0.10 | C (120) | 0.044 | 3.4 | 1.28 | 4.02 | 78 | 1.55 |
| 21 | (1) | 0.10 | C (84) | 0.028 | 2.9 | 1.70 | 3.02 | 59 | 1.69 |
| 22 | (1) | 0.03 | C (120) | 0.044 | 10.5 | 3.0 | 1.71 | 33 | 2.32 |

Table V
Product Evaluation

| Example No. | Peel Adhesion (kg/cm) | R.T. (23" C.) Shear 1000 gr. 1.56 cm² (min. to fail) |
|---|---|---|
| 18 | .96–1.00 | 0.9 COH |
|   | .94–.98 | 0.9 COH |
| 19 | 1.06–1.12 | 0.8 COH |
|   | 1.08–1.14 | 0.9 COH |
| 20 | .96–1.02 | 1.5 COH |
|   | 1.08–1.20 | 1.5 COH |
| 21 | .80–.96 | 2.1 COH |
|   | .98–1.12 | 2.5 COH |
| 22 | 1.12–1.20 | 7.0 COH |
|   | 1.16–1.26 | 7.1 COH |

Thus, irradiation with short wave length UV even in the intensity range of the present invention does not produce the same results as irradiation with UV in the 3000–4000 Å range, since the cohesive strengths (as measured by shear) are extremely low.

EXAMPLES 23–24

Adhesives suitable for packaging applications.

The packaging properties of a pressure-sensitive adhesive are affected by its chemical composition and its molecular weight. By selecting proper chemical constituents and following the present invention a pressure-sensitive tape with good packaging properties can be prepared. However, by departing from the invention only in the irradiation utilized, the balance of properties is lost. This is shown by the following two examples.

The same syrup was used for both and was prepared as follows:

(4) 87 parts of isooctyl acrylate, 8 parts of N-vinyl pyrrolidinone, 3 parts of acrylic acid, 2 parts of acrylamide, and 0.25 parts of benzoin ethyl ether were combined in a glass jar and partially polymerized to a coatable viscosity by brief exposure to black light fluorescent lamps.

The syrup was coated by applying it to 1 mil polyethylene terephthalate film with a number 28 wire wound bar (coating thickness about 1.5 mils or 37 microns). Polymerization was accomplished by means of light source A or light source D, the details of these examples being provided by the following two tables:

Table VI

| Example No. | Composition | % BEE | Light Source (volts) | Light Intensity 3000–4000 Å mwatts cm$^2$ | Total Energy 3000–4000 Å mwatt-sec/cm$^2$ | Exposure Time (min) | Rate of polymerization g-moles/liter-min | %/min | Inherent Viscosity |
|---|---|---|---|---|---|---|---|---|---|
| 23 | (4) | 0.25 | A (120) | .337 | 56.6 | 2.8 | 1.83 | 36 | 2.64 |
| 24 | (4) | 0.25 | D — | 12.91 | 270. | 0.35 | 14.7 | 286 | 1.52 |

Table VII
Product Evaluation

| Example No. | Peel Adhesion (kg/cm) | R.T. Snear 1000 gr. 1.56 cm$^2$ (min to fail) | PACKAGING PROPERTIES Soft Box days(mm) | Hard Box days(mm) |
|---|---|---|---|---|
| 23 | .72 | 1332 COH | 16(.4) | 8 COH* |
|    | .74–.78 | 1545 COH | 16(.4) | 16 COH |
| 24 | .72–.76 | 41 COH | 0.5 COH | .002 COH |
|    | .80–.88 | 41 COH | 16(6) | .002 COH |

*COH indicates a cohesive failure of the adhesive (i.e. residues remain both on tape and box.

Thus, at the higher rate of polymerization, the cohesive strength as measured by shear declined markedly. Also the packaging properties suffered severely. In both tests, the tape produced at an intensity and spectral range outside of the present invention either slipped badly or failed completely. The peel adhesion, however, was virtually indistinguishable between the samples.

EXAMPLE 25

The use of substituted acrylamides in the process of the present invention.

The following formulation was prepared for coating.

(5) 88 parts of isooctyl acrylate, 5 parts of acrylic acid, and 7 parts of N-isopropyl acrylamide were combined with 0.25 parts of anisoin ethyl ether. The mixture was prepolymerized according to the method described in syrup (2) in Examples 1–17. Coating was carried out as previously described using a number 20 wire wound bar and 1.5 mil (37 micron) cellulose acetate backing. Results are described in the following tables:

TABLE VIII

| Composition | % BEE | Light Source (volts) | Light Intensity 3000–4000 Å mwatts cm$^2$ | Total Energy 3000–4000 Å mwatt-sec/cm$^2$ | Exposure Time (min) | Rate of Polymerization g-moles/liter-min | %/min |
|---|---|---|---|---|---|---|---|
| (5) | 0.25 | A (120) | .337 | 60.7 | 3.0 | 1.75 | 33 |

Table IX
Product Evaluation

| Peel Adhesion (kg/cm) | R.T. (23° C.) Shear 1000gr. 1.56 cm$^2$ (min to fail) |
|---|---|
| .94 | 118.3 |

EXAMPLE 26

The preparation of pressure-sensitive adhesives in thick sections.

94 Parts of tetradecylacrylate and 6 parts of methacrylic acid were combined with 0.25 part of anisoin ethyl ether. The homogeneous mixture was poured into a polyethylene dish to a depth of 1.9 centimeters and exposed to light source A as described above for 30 minutes while in an inert atmosphere. During the exposure the monomeric mixture was converted to a polymeric pressure-sensitive adhesive mass.

The properties of this polymer were determined by dissolving it in ethyl acetate, coating on 2 mil polyester film according to the usual method at a thickness of about 1.5 mils (on a dry basis) and drying in an oven at 66° C. for about 15 minutes. The peel adhesion of this adhesive was greater than 800 grams per centimeter and the shear was greater than 50 minutes.

EXAMPLE 27

The preparation of a crosslinked pressure-sensitive adhesive.

A monomer mixture of 98 parts isooctyl acrylate and 2 parts acrylic acid was reacted to about 10 percent conversion (1500 cps viscosity, Brookfield). About 0.25 weight percent of benzoin ethyl ether and 0.15 weight percent of 2,4-bis(trichloromethyl)-6-p-methoxystyryl-s-triazine (a photocrosslinker) were added. The resulting syrup was coated onto a tape backing at a thickness of 2 mils by conventional means and the coated backing was passed into a nitrogen-flushed (inert) chamber. While in the inert chamber, the coating was subjected to ultraviolet irradiation substantially equivalent to that of source A (described previously) for 3–6 minutes.

The resulting crosslinked adhesive was more than 95 percent polymerized and had a peel adhesion to glass greater than 0.8 kilogram per centimeter and a shear strength greater than 10,000 minutes.

What is claimed is:

1. A process for the preparation of a normally tacky pressure-sensitive adhesive comprising subjecting a suitable mass of a radiation-sensitized solventless liquid mixture containing as a major proportion thereof at least one acrylic acid ester of an alkyl alcohol, said alcohol containing from 4 to 14 carbon atoms, and at least one monomer copolymerizable therewith to radiation in the near ultraviolet region at a rate or irradiation in the 3000–4000 Å wavelength range of not more than 7 milliwatts per square centimeter of the mass exposed, said radiation allowably also containing incidental radiation energy, the amount of said incidental radiation energy having wavelengths shorter than 3000 Å being limited to not more than about 10% of the amount of energy in the 3000–4000 Å range.

2. A process for the preparation of a normally tacky pressure-sensitive adhesive comprising subjecting a suitable mass of up to about 1.9 centimeters thickness of a radiation-sensitized solventless liquid mixture containing as a major proportion thereof at least one acrylic acid ester of an alkyl alcohol, said alcohol containing from 4 to 14 carbon atoms, and at least one monomer copolymerizable therewith to radiation in the near ultraviolet region at a rate of irradiation in the 3000–4000 Å wavelength range of from 0.1 to 7 milliwatts per square centimeter of the mass exposed, said radiation allowably also containing incidental radiation energy, the amount of said incidental radiation energy having wavelengths shorter than 3000 Å being limited to not more than about 10% of the amount of energy in the 3000–4000 Å range, until at least about 95% of the monomer present in the mass has been polymerized, whereby a tacky, flexible pressure-sensitive adhesive having peel adhesion to glass greater than about 0.8 kilograms per centimeter and shear strength greater than 50 minutes is formed.

3. A process for the preparation of a normally tacky pressure-sensitive adhesive comprising the steps of
   (1) preparing a suitably radiation-sensitized, solventless, liquid mixture comprising
      (a) 70–98 parts of units of at least one alkyl acrylate of which the alkyl group contains from 4 to 14 carbon atoms and
      (b) 2–30 parts of units of at least one modifying monomer copolymerizable therewith the sum of (a) and (b) amounting to 100 parts by weight, and
      (c) 0.01–5 parts of a photoinitiator, and
   (2) subjecting the mixture in a mass having a thickness of not more than about 1.9 cm. to radiation having wave lengths of 3000–4000 Å at a rate of irradiation of from 0.1 to 7 milliwatts per square centimeter of the mass exposed, said radiation allowably also containing incidental radiation energy, the amount of said incidental radiation energy having wave lengths shorter than 3000 Å being limited to not more than about 10% of the amount of energy in the 3000–4000 Å range, until at least about 95% of the monomer has been polymerized,
whereby a tacky, flexible pressure-sensitive adhesive having peel adhesion to glass greater than about 0.8 kilograms per centimeter and shear strength greater than 50 minutes is formed.

4. A process according to claim 3 wherein the mixture contains 85–92 parts of (a) and 8–15 parts of (b), the sum of the two being 100 parts by weight.

5. A process according to claim 3 wherein the modifying monomer is acrylic acid.

6. A process for the manufacture of a pressure-sensitive adhesive tape comprising
   (1) coating a flexible tape backing with up to about 125 micron layer of a viscous suitably radiation-sensitized solventless syrup containing at least one acrylic acid ester of an alkyl alcohol, said alcohol containing from 4 to 14 carbon atoms, and at least one monomer copolymerizable therewith,
   (2) subjecting the layer to radiation in the near ultraviolet region at a rate of irradiation of 3000–4000 Å wavelength of not more than 7 milliwatts per square centimeter of the layer exposed, said radiation allowably also containing incidental radiation energy, the amount of said incidental radiation energy having wavelengths shorter than 3000 Å being limited to not more than about 10% of the amount of energy in the 3000–4000 Å range.

7. A process for the manufacture of a pressure-sensitive adhesive tape comprising
   (1) coating a flexible tape backing with up to about 125 micron layer of a viscous suitably radiation-sensitized solventless syrup containing at least one acrylic acid ester of an alkyl alcohol, said alcohol containing from 4 to 14 carbon atoms, and at least one monomer copolymerizable therewith,
   (2) subjecting the layer to radiation in the near ultraviolet region at a rate of irradiation of 3000–4000 Å wave length of from 0.1 to 7 milliwatts per square centimeter of the layer exposed, said radiation allowably also containing incidental radiation energy, the amount of said incidental radiation energy having wave lengths shorter than 3000 Å being limited to not more than about 10% of the amount of energy in the 3000–4000 Å range, until at least about 95% of the monomer has been polymerized,
whereby the syrup is converted to a tacky, flexible pressure-sensitive adhesive having peel adhesion to glass greater than about 0.8 kilograms per centimeter and shear strength greater than 50 minutes.

8. A process for the manufacture of a pressure-sensitive adhesive tape comprising
   (1) coating a flexible tape backing with up to about a 125 micron layer of a prepolymerized syrup of a suitably radiation-sensitized solventless mixture comprising
      (a) 70–98 parts of units of at least one alkyl acrylate of which the alkyl group contains from 4 to 14 carbon atoms and
      (b) 2–30 parts of units of at least one modifying monomer copolymerizable therewith the sum of (a) and (b) amounting to 100 parts by weight, and
      (c) 0.01–5 parts of a photoiniator, and
   (2) subjecting the layer to radiation in the near ultraviolet region at a rate of irradiation of 3000–4000 Å wave length of from 0.1 to 7 milliwatts per square centimeter of the layer exposed, said radiation allowably also containing incidental radiation energy, the amount of said incidental radiation energy having wave lengths shorter than 3000 Å being limited to not more than about 10% of the amount of energy in the 3000–4000 Å range, until at least about 95% of the monomer has been polymerized,
whereby the syrup is converted to a tacky, flexible pressure-sensitive adhesive having peel adhesion to glass greater than about 0.8 kilograms per centimeter and shear strength greater than 50 minutes.

9. A process according to claim 8 wherein the mixture contains 85–92 parts of (a) and 8–15 parts of (b), the sum of the two being 100 parts by weight.

10. A process according to claim 8 wherein the modifying monomer is acrylic acid.

11. A process for the preparation of a normally tacky pressure-sensitive adhesive comprising
(1) subjecting a suitable low viscosity liquid mixture of at least one acrylic acid ester of an alkyl alcohol, said alcohol containing from 4 to 14 carbon atoms and at least one monomer copolymerizable therewith to prepolymerizing conditions to form a relatively viscous syrup in which from about 5 to 10 percent of the monomers have been converted to polymer,
(2) forming a radiation-sensitive means of up to about 1.9 centimeters thickness comprising the syrup, and
(3) subjecting the mass to radiation in the near ultraviolet region at a rate of irradiation in the 3000–4000 Å wavelength range of from 0.1 to 7 milliwatts per square centimeter of the mass exposed, said radiation allowably also containing incidental radiation energy, the amount of said incidental radiation energy having wavelengths shorter than 3000 Å being limited to not more than about 10% of the amount of energy in the 3000–4000 Å range, until at least about 95% of the monomer has been polymerized,
whereby a tacky, flexible pressure-sensitive adhesive having peel adhesion to glass greater than about 0.8 kilograms per centimeter and shear strength greater than 50 minutes is formed.

12. A process for the preparation of a normally tacky pressure-sensitive adhesive comprising
(1) subjecting a suitable low viscosity liquid mixture comprising
 (a) 70–98 parts of at least one alkyl acrylate monomer of which the alkyl group contains from 4 to 14 carbon atoms and
 (b) 2–30 parts of at least one modifying monomer copolymerizable therewith the sum of (a) and (b) amounting to 100 parts by weight,
to prepolymerizing conditions to form a relatively viscous syrup in which from about 5 to 10 percent of the monomers have been converted to polymer,
(2) forming a radiation-sensitive mass of up to about 1.9 centimeters thickness comprising the syrup, and
(3) subjecting the mass to radiation in the near ultraviolet region at a rate of irradiation in the 3000–4000 Å wavelength range of from 0.1 to 7 milliwatts per square centimeter of the mass exposed, said radiation allowably also containing incidental radiation energy, the amount of said incidental radiation energy having wave lengths shorter than 3000 Å being limited to not more than about 10% of the amount of energy in the 3000–4000 Å range, until at least about 95% of the monomer has been polymerized,
whereby a tacky, flexible pressure-sensitive adhesive having peel adhesion to glass greater than about 0.8 kilograms per centimeter and shear strength greater than 50 minutes is formed.

* * * * *